(12) United States Patent
Watson et al.

(10) Patent No.: US 8,806,897 B2
(45) Date of Patent: Aug. 19, 2014

(54) FURNACE AND PROCESS FOR CONTROLLING THE OXIDATIVE STATE OF MOLTEN MATERIALS

(75) Inventors: Matthew James Watson, Bethlehem, PA (US); Michael Edward Habel, Charlotte, NC (US); Kevin Alan Lievre, Allentown, PA (US); Xiaoyi He, Orefield, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 200 days.

(21) Appl. No.: 12/814,045

(22) Filed: Jun. 11, 2010

(65) Prior Publication Data

US 2010/0313604 A1 Dec. 16, 2010

Related U.S. Application Data

(60) Provisional application No. 61/186,418, filed on Jun. 12, 2009.

(51) Int. Cl.
 *C03B 5/00* (2006.01)
(52) U.S. Cl.
 USPC .............. 65/136.3; 65/135.9; 65/335
(58) Field of Classification Search
 USPC ............. 65/136.3, 335, 135.9, 136.2
 See application file for complete search history.

(56) References Cited

U.S. PATENT DOCUMENTS

| | | | | |
|---|---|---|---|---|
| 3,592,623 A | * | 7/1971 | Shepherd | 65/134.4 |
| 4,433,995 A | * | 2/1984 | Toussaint | 65/135.8 |
| 4,473,388 A | * | 9/1984 | Lauwers | 65/134.4 |
| 4,536,205 A | | 8/1985 | Krumwiede et al. | |
| 4,927,357 A | * | 5/1990 | Yap | 432/22 |
| 4,957,050 A | * | 9/1990 | Ho | 110/346 |
| 5,006,144 A | * | 4/1991 | Knavish et al. | 65/134.3 |
| 5,030,594 A | | 7/1991 | Heithoff | |
| 5,139,558 A | * | 8/1992 | Lauwers | 65/134.4 |
| 5,417,731 A | * | 5/1995 | LeBlanc et al. | 65/134.4 |
| 5,575,637 A | * | 11/1996 | Slavejkov et al. | 431/8 |
| 5,601,425 A | * | 2/1997 | Kobayashi et al. | 431/8 |
| 5,609,662 A | * | 3/1997 | Kobayashi et al. | 65/135.1 |
| 5,611,682 A | * | 3/1997 | Slavejkov et al. | 431/8 |

(Continued)

FOREIGN PATENT DOCUMENTS

| | | |
|---|---|---|
| EP | 1 251 105 A2 | 10/2002 |
| EP | 1251105 A2 | 10/2002 |
| WO | 9012760 A1 | 11/1990 |

OTHER PUBLICATIONS

Schatz, C.; "High-Performance Oxy-Fuel Melting: Three Flat Jet Burner Applications", Ceramic Engineering and Science Proceedings, American Ceramic Society, Inc.; vol. 17, No. 2; Jan. 1, 1996; pp. 152-161.

(Continued)

*Primary Examiner* — Richard Crispino
*Assistant Examiner* — Yana B Krinker
(74) *Attorney, Agent, or Firm* — Michael K. Boyer; Larry S. Zelson (57) ABSTRACT

A method useful with oxy-fuel combustion and in a furnace which contains molten material, wherein either substoichiometric or superstoichiometric combustion and low velocity injection of fuel and primary and secondary oxidant in an oxy-fuel burner are carried out in an orientation which forms either a reducing or oxidizing atmosphere proximate the molten surface.

8 Claims, 8 Drawing Sheets

(56) References Cited

U.S. PATENT DOCUMENTS

| | | | |
|---|---|---|---|
| 5,628,809 A * | 5/1997 | Kobayashi | 65/134.4 |
| 5,755,818 A * | 5/1998 | Tuson et al. | 431/10 |
| 5,853,448 A * | 12/1998 | Duchateau et al. | 65/134.4 |
| 6,041,622 A * | 3/2000 | Duchateau et al. | 65/134.4 |
| 6,047,565 A | 4/2000 | Moreau | 65/32.1 |
| 6,203,314 B1 * | 3/2001 | Philippe et al. | 432/19 |
| 6,237,369 B1 * | 5/2001 | LeBlanc et al. | 65/134.1 |
| 6,253,578 B1 | 7/2001 | Kobayashi et al. | |
| 6,422,041 B1 * | 7/2002 | Simpson et al. | 65/134.4 |
| 6,519,973 B1 * | 2/2003 | Hoke et al. | 65/134.4 |
| 6,524,097 B2 | 2/2003 | Hoke, Jr. et al. | |
| 6,532,771 B1 | 3/2003 | Kobayashi et al. | |
| 6,540,508 B1 * | 4/2003 | Simpson et al. | 431/154 |
| 6,659,762 B2 | 12/2003 | Borders et al. | 431/8 |
| 6,705,117 B2 * | 3/2004 | Simpson et al. | 65/134.4 |
| 6,705,118 B2 * | 3/2004 | Simpson et al. | 65/134.4 |
| 7,390,189 B2 | 6/2008 | D'Agostini | |
| 7,392,668 B2 * | 7/2008 | Adams et al. | 65/346 |
| 7,475,569 B2 * | 1/2009 | Baker et al. | 65/335 |
| 8,201,418 B2 * | 6/2012 | Leconte | 65/136.3 |
| 8,304,358 B2 * | 11/2012 | Shelestak et al. | 501/70 |
| 8,336,335 B2 * | 12/2012 | Beaudoin et al. | 65/134.4 |
| 2001/0023053 A1 * | 9/2001 | Hoke et al. | 431/8 |
| 2001/0039813 A1 * | 11/2001 | Simpson et al. | 65/134.4 |
| 2002/0092325 A1 * | 7/2002 | Muschik et al. | 65/134.3 |
| 2002/0152770 A1 * | 10/2002 | Becher et al. | 65/134.4 |
| 2003/0024271 A1 * | 2/2003 | Simpson et al. | 65/134.4 |
| 2005/0188725 A1 * | 9/2005 | Tullman et al. | 65/134.3 |
| 2006/0105899 A1 | 5/2006 | Jacques et al. | |
| 2006/0272453 A1 | 12/2006 | Soupos et al. | |
| 2007/0119213 A1 * | 5/2007 | Simpson et al. | 65/157 |
| 2007/0213195 A1 | 9/2007 | Hikata et al. | |
| 2008/0256981 A1 | 10/2008 | Jacques et al. | |
| 2008/0276648 A1 | 11/2008 | Leconte | |
| 2009/0004611 A1 | 1/2009 | Kobayashi | |
| 2009/0293546 A1 * | 12/2009 | Tsiava | 65/66 |
| 2010/0101278 A1 * | 4/2010 | Jacques | 65/474 |
| 2010/0126218 A1 * | 5/2010 | Shelestak et al. | 65/30.1 |
| 2010/0257899 A1 * | 10/2010 | Beaudoin et al. | 65/33.9 |
| 2010/0313604 A1 * | 12/2010 | Watson et al. | 65/136.3 |

OTHER PUBLICATIONS

Viduna, J., et al; "Brulers a Oxy-Fuel FRtm Ciranfire: Les Nouveaux Bruleurs a Flamme Plate Reduidsent la Consammation en Carburant"; Verre, Insitut Du Verre, Paris, Fr.; vol. 14, No. 4; Aug. 1, 2008; pp. 52-57.

Schatz, C.; "High-Performance Oxy-Fuel Melting: Three Flat Jet Burner Applications"; Ceramic Engineering and Science Proceedings, American Ceramic Society Inc.; vol. 17, No. 2; Jan. 1, 1996; pp. 152-161; XP000622575.

Viduna, J., et al; "Brulers a Oxy-Fuel FRtm Clranfire: Les Nouveaux Bruleurs a Flamme Plate Reduidsent la Consammation en Carburant"; Verre, Insitut Du Verre, Paris, Fr.; vol. 14, No. 4; Aug. 1, 2008; pp. 52-57' X {001520358.

Watson, Matthew; "Multi-mode Combustion Device and Method for Using the Device;" U.S. Appl. No. 12/688,115, filed Jan. 15, 2010.

Pigeonneau et al; "Shrinkage of an oxygen bubnle rising in a molten gas;" Chemical Engineering Science 65 (2010); pp. 3158-3168.

Trier, Wolgang; "Glass furnaces: design, construction and operation;" Society of Glass Techology; ISBN 0-900682-20-5; 1987 and reprinted 2000; p. 1440158.

Reaction web: properties of a species or chemical reaction www.crct.polymtl.ca/reacweb.htm. Jun. 17, 2010.

* cited by examiner

Simulated glass flow in a glass melter. Convective cells exist due to natural convection. The hot spring is located just downstream Port 6.

FIG. 6

Molar concentration of $O_2$ in glass melt. The oxygen in the melt is brought to the surface by the hot spring and escapes to the atmosphere.

FIG. 7

Molar concentration of FeO in glass melt. The high FeO concentration occurs in the refining zone.

FIG. 8

Oxygen concentration difference in flow impurity glass melt (0.01% by weight). Oxy-fuel firing over the hot zone reduces the $O_2$ concentration difference more effectively than firing over the batch.

FIG. 9

Oxygen concentration difference in high impurity glass melt (0.01% by weight).

FURNACE AND PROCESS FOR CONTROLLING THE OXIDATIVE STATE OF MOLTEN MATERIALS

CROSS-REFERENCE TO RELATED APPLICATIONS

This application claims benefit of Provisional Application No. 61/186,418, filed Jun. 12, 2009. The disclosure of this application is hereby incorporated by reference.

BACKGROUND OF THE INVENTION

Certain aspects of this invention relate to staged, flat-flame combustion within a furnace which contains molten material such as glass to be affected by heat generated by the combustion. The combustion is also used to affect the oxidation state of the iron in the molten glass in the refining or fining section of the glass melting furnace.

In many industrial heating processes fired with fuel and oxidant, products of fuel combustion in the melting end of the furnace may interact or react with molten material and often cause undesirable effects. For example, a fuel rich flame impinging over melting glass in a glass melting furnace is known to cause color change in glass product due to redox change of the glass melt exposed to the fuel rich flame.

Nitrogen oxides (NOx) can be a pollutant generated during combustion and it is desirable to reduce their generation in carrying out combustion. It is known that combustion may be carried out with reduced NOx generation by using technically pure oxygen or oxygen-enriched air as the oxidant as this reduces the amount of nitrogen provided to the combustion reaction on an equivalent oxygen basis. However, the use of an oxidant having a higher oxygen concentration than that of air causes the combustion reaction to run at a higher temperature and this higher temperature kinetically favors the formation of NOx. Staged combustion has been used to reduce NOx generation. U.S. Pat. Nos. 5,611,682, 6,524,097 and U.S. Pat. No. 7,390,189 (hereby incorporated by reference) describe a staged oxy-fuel burner for producing a generally flat fuel rich flame overlying a highly radiative fuel lean flame.

Glass that is fairly neutral or clear in color, and highly transparent to visible light (e.g., at least 75% transmissive, or even more preferably at least 80% transmissive), is desirable for supply of the solar glass industry, among other industries. One way of achieving such a glass is to use very pure base glass materials (e.g., substantially free of colorants such as iron). However, base materials with a high degree of purity are expensive and thus not always desirable and/or convenient. In other words, for example, the removal of iron from glass raw materials has certain practical and/or economical limits. Other methods to produce "clear" glass is to introduce exotic batch materials that help with oxidization.

Control of the oxidative state of the glass is useful in producing "clear" or brilliant glass. In some cases, it is desirable to have the iron in a very low FeO (ferrous state) content (e.g., as discussed in US20060581784; hereby incorporated by reference). This can be advantageous since ferrous iron (Fe 2+; FeO) is a much stronger colorant than is ferric iron (Fe 3+; Fe2O3).

There is a need in this art for a furnace and method for controlling the oxidative state of transition metals in a molten material.

BRIEF SUMMARY OF THE INVENTION

The instant invention can solve problems associated with conventional methods for obtaining molten materials by using, for example, flat-flame, staged combustion technology to influence the oxidation state of transition metal ions associated with a molten material. Influencing the oxidation state can impact the chemical and physical properties of the molten material (e.g., oxidizing iron ions to Fe(III)), in order to improve the quality of molten materials (e.g., improving the clarity of the float glass such as solar glass).

One aspect of the invention relates to a staged, flat-flame combustion method wherein fuel and oxidant are contacted in a combustion reaction having streamlined flows within the staged, flat-flame burner, and with the molten glass being in contact with either the combustion reaction to increase the quantity of Fe(II) in the molten glass, or in contact with the staged oxygen to increase the quantity of Fe(III) in the molten glass while still ensuring effective heat transfer from the combustion reaction to the molten glass.

Another aspect of the invention relates to controlling the oxidation state of transition metal ions by operating a flat-flamed burner in the refining zone (sometimes referred to as the fining zone) of a glass furnace in a manner that affects the oxidative state (e.g., the burner increases the quantity of Fe(III) in the molten glass).

A further aspect of the invention relates to a glass furnace comprising a melting zone and a refining zone wherein the refining zone comprises a staged, flat-flame burner. The burner, products of incomplete combustion or products of complete combustion, and staging oxygen are oriented in a manner relative to the molten glass surface in order to affect the oxidative state of transition metal ions (e.g., iron) in the molten glass.

One aspect of the invention relates to a method for carrying out combustion comprising:
(A) injecting into a furnace wherein
(i) the furnace comprises a charging end, a discharge end, a melting zone adjacent the charging end and a fining zone in fluid contact with the discharge end;
(ii) the glass forming ingredients are introduced into the melting zone, travel along a path from the melting zone to the fining zone and are withdrawn as molten glass from the fining zone; and
(iii) there is a combustion energy requirement over both the melting zone and the fining zone; and
said furnace contains molten glass, injecting at a point above the molten glass, fuel and primary oxidant in a flat-flame configuration and a substoichiometric ratio not less than about 50 percent of stoichiometric, said primary oxidant being a fluid comprising at least 21 mole percent oxygen, both of said fuel and primary oxidant being injected into the furnace at a velocity of about 1000 feet per second or less;
(B) combusting fuel and primary oxidant within the furnace to produce heat and combustion reaction products including unreacted oxygen and unburned fuel;
(C) injecting secondary oxidant into the furnace in a flat jet configuration below the injection point of the fuel and primary oxidant, said secondary oxidant being a fluid comprising at least about 21 mole percent oxygen, at a velocity of about 2000 standard feet per second or less;
(D) establishing an oxygen-rich gas layer proximate the molten glass, said oxygen-rich gas layer being more oxidizing to at least one of the charge or the molten glass than the primary stream; and
(E) combusting secondary oxidant with unburned fuel to provide additional heat and combustion reaction products within the furnace.

Another aspect of the invention relates to a method for carrying out combustion comprising:

(A) injecting into a furnace wherein
  (i) the furnace comprises a charging end, a discharge end, a melting zone adjacent the charging end and a fining zone adjacent the discharge end;
  (ii) the glass forming ingredients are introduced into the melting zone, travel along a path from the melting zone to the fining zone and are withdrawn as molten glass from the fining zone; and
  (iii) there is a combustion energy requirement over both the melting zone and the fining zone; and
said furnace contains molten glass, injecting at a point above the molten glass, fuel and primary oxidant in a staged flat-flame configuration and a substoichiometric ratio not exceeding about 70 percent of stoichiometric, said primary oxidant being a fluid comprising at least about 21 mole percent oxygen, both of said fuel and primary oxidant being injected into the furnace at a velocity of about 1000 feet per second or less;

(B) combusting fuel and primary oxidant within the furnace to produce heat and combustion reaction products including unburned fuel;

(C) injecting secondary oxidant into the furnace in a flat jet configuration above the injection point of the fuel and primary oxidant, said secondary oxidant being a fluid comprising at least about 21 mole percent oxygen, at a velocity of about 2000 standard feet per second or less;

(D) establishing a fuel rich gas layer proximate the molten glass, said fuel rich gas layer being more reducing to at least one of the charge or molten glass than the secondary oxidant; and (E) combusting secondary oxidant with unburned fuel to provide additional heat and combustion reaction products within the furnace.

Another aspect of the invention relates to a method for affecting the oxidation state of metal species comprising introducing into a furnace, which contains molten glass in a refining zone, at a point above the refining zone, fuel and primary oxidant, combusting fuel and primary oxidant within the furnace and above the refining zone and in a staged flat flame in order to produce heat and combustion reaction products, introducing secondary oxidant into the furnace either above or below the staged flat flame, establishing a fuel rich gas layer and a oxygen rich gas layer; and, exposing one of the gas layers to the molten glass under conditions sufficient to change the oxidative state of transition metal species in the molten glass.

A further aspect of the invention relates to a furnace comprising: a glass making charge, a melting zone, molten charge and a refining zone wherein the refining zone comprises a staged, flat-flame burner positioned above molten charge.

DETAILED DESCRIPTION OF THE INVENTION

As used herein the term "flat flame" means a visible flame wherein the longest dimension of a cross section of the flame, taken perpendicular to the surface of the molten material, is parallel to the molten surface.

As used herein the term "products of complete combustion" means one or more of carbon dioxide and water vapor.

As used herein the term "products of incomplete combustion" means one or more of carbon monoxide, hydrogen, carbon and partially combusted hydrocarbons.

As used herein the term "unburned fuel" means material that comprises one or more of fuel which has undergone no combustion, products of incomplete combustion of the fuel, and mixtures thereof.

As used herein the term "staged" or "staging" means staging as defined in U.S. Pat. No. 5,611,682; the disclosure of which is hereby incorporated by reference.

As used herein the term "stoichiometric" means the ratio of oxygen to fuel for combustion purposes. A stoichiometric ratio of less than about 100 percent means there is less oxygen present than the amount necessary to completely combust the fuel present (i.e., fuel-rich conditions). A stoichiometric ratio greater than about 100 percent means there is more oxygen present than the amount necessary to completely combust the fuel (i.e., oxygen-rich or excess oxygen conditions).

As used herein the term "fining" or "refining zone" means that portion of the glass melting furnace which is not the melting zone, and located between the end of the melting zone and the discharge end of the furnace.

As used herein the term "spring zone" means that a zone located within the glass furnace wherein two convection cells a cause an upwelling of molten glass. Depending upon the design and conditions within the glass furnace a spring zone can be located within the melting zone, refining zone, among other areas.

Any industrial furnace or one or more zones of an industrial furnace which is heated by one or more burners may be used in the practice of this invention. An example of such a furnace comprises a glass melting furnace.

Heat generated in combustion reaction radiates to the glass raw material or charge to heat the molten glass. This heat radiates from combustion reaction to the molten glass directly or indirectly through complex radiative interactions with surrounding furnace gases and walls. A relatively small amount of heat is passed from the combustion reaction to the charge by convection in high temperature furnaces.

The present invention relates broadly to a process and furnace for melting glass forming ingredients. In the typical glass melting furnace, or glass tank as it is commonly referred to, the raw glass making materials, termed batch, are charged into the melting zone of the furnace. Except when a furnace is initially started, glass furnaces are operated continuously and, therefore, there is an existing bath of molten glass, termed melt, in the melting zone onto which the raw material is placed. The molten glass and un-melted batch are collectively referred to as the "charge". The raw or unmelted batch may be charged into the tank by any of the well-known mechanical charging devices. In typical practice, the batch materials float on the surface of the molten bath forming a semi-submerged layer containing un-melted solids termed a batch blanket. The blanket sometimes breaks up to form separate batch piles or batch islands (also called rafts or logs). For the purposes of this invention, the section of the furnace containing significant unmelted batch solids floating on the surface of a molten glass bath is defined as the "melting zone". For example, that portion of the furnace where unmelted batch solids are visibly floating on the surface. The glass then enters the refining zone wherein bubbles are released and in the refining zone, glass is homogenized and defects, such as bubbles or "seeds" are driven out. Glass is continuously withdrawn from the refining zone. The melting zone and the fining zone of a glass tank may be present in a single chamber or the glass tank may consist of two or more connected and distinct chambers.

The instant invention can be employed for controlling or modifying charges of materials (e.g., those used to make glass), which are susceptible to a change in oxidative state when exposed to combustion conditions within a furnace. An example of a material that is susceptible to a change in oxidative state comprise a molten charge comprising a cation capable of taking on multiple oxidative states such as a transition metal cation including a transition metal oxide. A specific example that is susceptible to a change in oxidative state is a charge comprising iron cations such as iron oxide in the form comprising one or more of $FeO$, $Fe_3O_4$ (or similar mixed oxidation state) or $Fe_2O_3$. Iron oxide forms are typically present in glass making charges.

In a glass melting furnace of the continuous type a body of molten glass is maintained in the furnace and raw glass batch materials are fed through an inlet at one end of the furnace onto the surface of the pool of molten glass. There, the batch materials form an unmelted layer or "blanket" on the surface of the molten glass pool which may extend a considerable distance into the furnace until it becomes melted into the pool of molten glass. Heat for melting the batch is provided within the furnace by combustion burners above the level of the molten glass, sometimes aided by submerged electric heating means. At the opposite end of the furnace from the inlet end, melted glass is withdrawn from the pool of molten glass through an outlet opening. (e.g., as described in U.S. Pat. No. 4,536,205; hereby incorporated by reference).

Without wishing to be bound by an theory or explanation, the combustion space can affect the oxidation state of transition metal ions in the glass melt and glass currents in the glass melting furnace, and more specifically the "spring zone" (e.g., as described by Trier (W. Trier, *Glass Furnaces: design construction and operation*, p 144, translated by K. L. Loewenstein, Society of Glass Technology, 2000).

The effect of heating from above, heat losses from the tank, and the process of melting and refining can cause differences in density in the bath of molten glass which give rise to currents.

For the purposes of this disclosure, the section of the furnace containing significant unmelted batch solids floating on the surface of a molten glass bath is defined as the "melting zone", while the "fining zone" or "refining zone" is defined as that section of the furnace not containing significant un-melted batch solids floating on the surface of a molten glass bath. Foam or scum may be present on the surface of the molten glass bath in the refining zone or it may be clear, termed "mirror surface" glass (e.g., as described in U.S. Pat. No. 6,519,973; hereby incorporated by reference).

The batch blanket at the inlet end of the melting furnace is relatively cold and acts as a heat sink and also shields the underlying portion of the molten glass pool from radiant heat from the overhead combustion. On the other hand, the region of the molten glass pool just downstream from the location where the batch blanket is melted tends to be the hottest region in the molten glass pool. These temperature conditions create two counter-rotating circulation cells in the molten glass pool. The tendency of the hot glass in the region just beyond the batch blanket to rise, and the tendency of relatively cool glass near the inlet end to sink, establish a circulation pattern beneath the batch blanket wherein glass in the upper portion of the pool beneath the blanket flows toward the inlet end (i.e., in the upstream direction) and glass in the lower portion of the pool under the batch blanket flows toward the outlet (i.e., in the downstream direction). Between the end of the batch blanket and the outlet end of the furnace the circulation pattern is in the opposite direction, with the surface portion of the glass flowing in the downstream direction and the glass near the bottom of the pool flowing in the upstream direction. At the juncture of these two convection cells a strong upwelling of molten glass is produced, and therefore this region is known as the "spring zone." The molten glass near the surface in the spring zone is typically the hottest portion of molten glass in the melting furnace and, therefore, it is desirable that the throughput stream of glass pass through this region to insure thorough melting and refining of the glass. (e.g., as described in U.S. Pat. No. 4,536,205; hereby incorporated by reference).

The region of highest temperature on the crown of the furnace is known as the "hot spot". Typically, the crown's hot spot temperature is at least about 20K hotter (or at least one (1) percent hotter in absolute units such as Kelvin), than the crown temperature on the adjacent burner ports, and more typically about 40K hotter (or at least two (2) percent hotter in absolute units such as Kelvin), than the crown temperature on the adjacent burner ports. This hot-spot temperature, results in molten glass density gradients which create the natural convection upwelling described above in a region in the glass melt close to the hot spot in the combustion space. Typically, the location of the spring zone, relative to the hot spot is within about 20% of the furnace length, and more typically about 10% of the furnace length. The spring zone, helps to homogenize the glass, and can prevent the unreacted batch logs from entering the refining zone thereby decreasing the number defects in the final glass product (e.g., Trier, pp 144-156). Typically the hot spot temperature (in absolute units such as Kelvin) has a temperature which is 15% higher than the glass surface temperature at the spring zone, and more typically about 10% higher. In furnaces where there is not a significant difference in temperature between the hot spot and the rest of the furnace, the spring zone can also be forced, for example by using bubblers, or electrodes.

Iron in the ferrous state ($Fe^{2+}$; $FeO$) is a blue-green colorant, while iron in the ferric state ($Fe^{3+}$) is a yellow-green colorant. The blue-green colorant of ferrous iron ($Fe^{2+}$; $FeO$) is of particular concern when seeking to achieve a fairly clear or neutral colored glass, since as a strong colorant it introduces significant color into the glass. While iron in the ferric state ($Fe^{3+}$; $Fe_2O_3$) is also a colorant, it is of less concern when seeking to achieve a glass fairly clear in color since iron in the ferric state tends to be weaker as a colorant than its ferrous state counterpart. (U.S. Pat. No. 7,557,053; hereby incorporated by reference). That is the oxidation state of transition metal ions affects the transmission, brilliance and color of the final glass produced.

Alternatively iron in the ferrous state may be useful in some glass products, such as container glass, where the blue-green colorant of ferrous iron can be desired.

Without wishing to be bound by any theory or explanation, the formation of iron oxide in the ferrous state (FeO or Fe2+) in a glass production process can depend upon the mass transfer of oxygen. Fe ions typically enter a melter as an impurity in the raw charging material. Fe$_2$O$_3$ and FeO, with oxygen, form a reduction-oxidation (redox) couple:

$$Fe_2O_3 \underset{k_r}{\overset{k_f}{\rightleftharpoons}} 2FeO + \frac{1}{2}O_2$$

When the temperature increases to the melting point of glass, this redox reaction is relatively fast and is usually in equilibrium. The equilibrium constant, K, however, depends on the temperature, $$K = \frac{k_f}{k_r} = A_k \exp\left(-\frac{\Delta G}{RT}\right)$$

Where the equilibrium constant, K, for the redox couple can be defined as $$K = \frac{[FeO]^2[O2]^{0.5}}{[Fe2O3]}$$

And [FeO], for example, denotes concentration of FeO. Since the Gibbs energy, ☐G, for this reaction is of the order of 80,000 J/mol (per Reaction-web at http://www.crct.polymtl.ca/reacweb.htm), the reaction will shift to the right with a sufficient increase in temperature. That is, the value of K will increase when the temperature increases. For example, when comparing equilibrium constant at the surface temperature of glass in the spring zone at about 1450° C. to the equilibrium constant at the temperature in the glass surface of the refining zone at about 1375° C., (e.g., Trier, FIG. 6.78 p 155), the equilibrium constant in the spring zone can be about 2.76 times larger than the equilibrium constant in the refining zone. As a result, the concentration of FeO and O$_2$ typically reach the highest value in the mid-section of the furnace, especially in and around the spring zone, where the temperature is the highest. In a typical glass melting furnace, the oxygen concentration is very low in the combustion space, because the greatest fuel efficiency can be gained by running the ratio of fuel and oxidant very close to the stoichiometric ratio required for complete combustion. As a result of the low oxygen concentration in the combustion space above the glass melt, oxygen in the glass melt tends to diffuse out the glass and is not be available to convert FeO back to Fe$_2$O$_3$ as the glass is cooled while moving from the spring zone of the furnace to the refining section. A consequence is FeO formation, and therefore color, in the final glass produced. In the case of, for example solar glass, less FeO is desired in the final glass produce. In the case of some container glass, more FeO is desired in the final glass produced.

Without wishing to be bound by any theory or explanation, it is believed that the loss of oxygen from a glass melt to combustion space depends on several factors including the oxygen concentration gradient, the diffusivity, and the oxygen solubility in the glass melt. First, the oxygen concentration gradient is the highest around the spring zone, not only because of the high temperature pushing the equilibrium to favor formation of FeO and O2 as discussed above, but also due to the convective upward glass flow moving the oxygen from the bulk towards the surface and sharpening the concentration boundary layer.

Second, the diffusivity, D, of oxygen in the glass melt also increases with temperature, $$D = A_d \exp\left(-\frac{E_d}{\tau}\right)$$

Where $A_d=3\times10^{-3}$ m$^2$/S, and $E_d=26585$ K for soda-lime-silicate glass (e.g., as described by Pigeonneau et al., "Shrinkage of an oxygen bubble rising in a molten glass," Chemical Engineering Science (2010), 65 (10), 3158-3168). This implies the diffusivity will be highest near the spring zone too. For example when comparing oxygen diffusivity at the surface temperature of glass in the spring zone at about 1450° C. to the oxygen diffusivity at the average surface temperature in the refining zone at about 1375° C., the diffusivity in the spring zone is about 2 times larger than the diffusivity in the refining zone. The combination of the high oxygen concentration gradient and the thermally activity oxygen diffusivity in the glass melt indicates the highest oxygen loss from the glass melt to the combustion space above the glass melt would occur near the spring zone.

For the case where Fe3+ is desired in the final glass product, additional oxygen input, either via an oxygen burner (e.g., the burner of FIG. 3) or oxygen lance, would be most effective to prevent oxygen loss from the glass melt to the combustion space in the refining zone, preferably adjacent to or near the hot spot, and more preferably near the spring zone. The additional oxygen input creates a region of high oxygen concentration in the combustion space adjacent to the glass in the refining zone (and more preferably the spring zone), which in turn creates an oxygen concentration gradient that results in oxygen transport from the combustion space into the molten glass.

Figure 2:
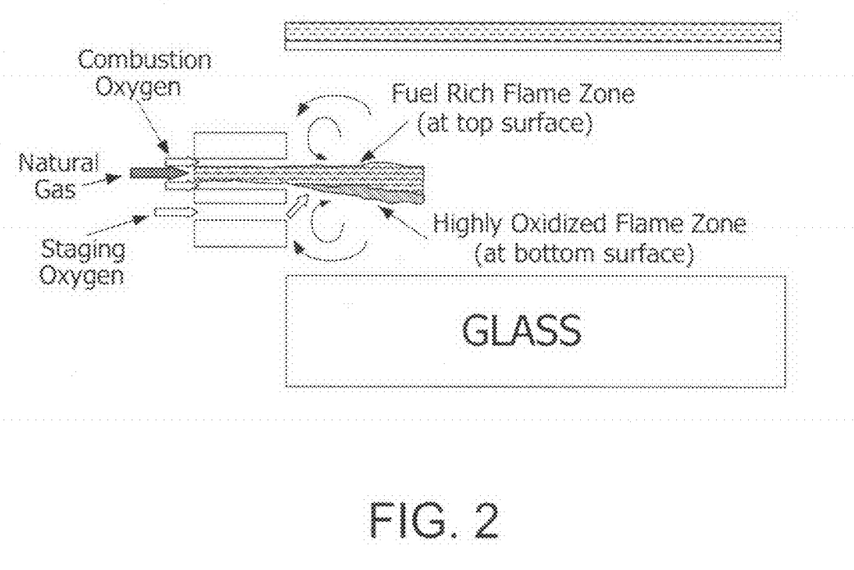
FIG. 2 is a schematic cross-sectional view of a glass furnace that includes a staged flat-flame burner for oxidizing transition metal cations.
Figure 3:
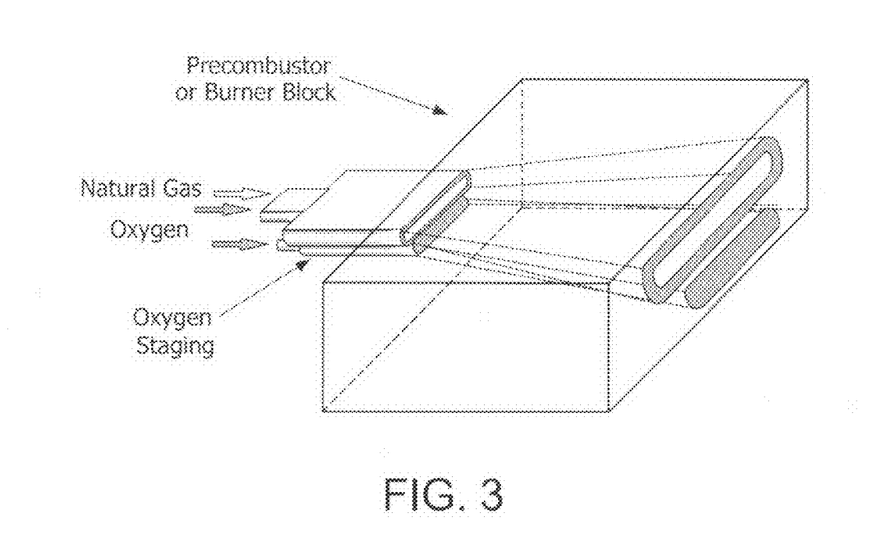
FIG. 3 is a staged flat-flame burner including a precombustor or burner block that can be used in the inventive furnace or method.

For the case where Fe2+ is desired in the final glass product, the use of substoichiometric (fuel rich, or oxygen lean) combustion would be most effective in enhancing oxygen loss from the glass melt to the combustion space in the refining zone, preferably near the spring zone (e.g., rotating the burner shown in FIG. 3 by 180 degrees thereby positioning the fuel rich flame zone of FIG. 2 adjacent to the molten glass surface). This creates a region of extremely low oxygen concentration (reducing conditions) in the combustion space adjacent to the glass in the refining zone (and more preferably the spring zone), which in turn creates an oxygen concentration gradient that results in oxygen transport from the molten glass into the combustion space.

Third, the solubility, L, of oxygen in the glass melt also increases with temperature, $$L = A_L \exp\left(-\frac{E_L}{\tau}\right)$$

Where $A_L=1.37\times10^{-4}$ mol m$^{-3}$ Pa$^{-1}$, and $E_L=6633$ K for soda-lime-silicate glass (e.g., as described by Pigeonneau et al. "Shrinkage of an oxygen bubble rising in a molten glass," Chemical Engineering Science (2010), 65(10), 3158-3168). This implies the solubility of O2 will be highest near the spring zone too. For example, when comparing oxygen solubility at the surface temperature of glass in the spring zone at about 1450° C. to the oxygen solubility at the average surface temperature in the refining zone at about 1375° C., the solubility in the spring zone is about 1.2 times larger than the solubility in the refining zone. It is believed that while the solubility of oxygen in the glass melt is increased at higher temperature, the increase is not the same order of magnitude as the increase in diffusivity, D, or the increase in equilibrium constant, K, as described above. However, for the case where $Fe^{3+}$ is the desired final oxidation state of iron ions in the glass, the enhanced solubility, coupled with the higher diffusivity is advantageous when oxygen is supplied in relatively high concentration in the combustion space adjacent to the glass in the refining zone (and more preferably the spring zone) because of the enhanced capacity of the glass to the dissolve the oxygen. This allows for subsequent oxidation of $Fe^{2+}$ to $Fe^{3+}$ using dissolved oxygen in the glass melt as the glass is cooled while moving from the spring zone of the furnace to the refining section.

Figure 1:
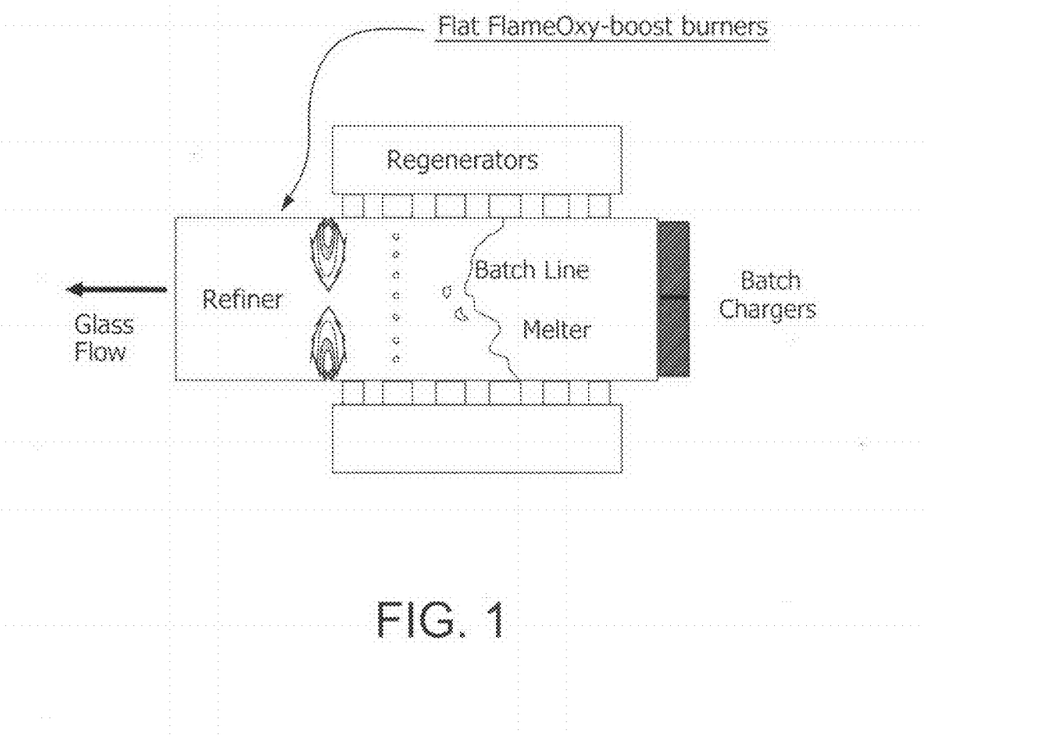
FIG. 1 is a schematic overhead drawing of a glass furnace that includes flat-flame burners located in the refining zone.

Referring now to FIG. 1, FIG. 1 is a schematic overhead drawing of a glass furnace that includes flat-flame burners located in the refining zone. Batch is charged into one end of the furnace, become molten, passes through the refiner or refining zone where the oxidative state of the molten glass is at least partially modified and then the glass exits the furnace.

In order to establish conditions within a furnace that are sufficient to affect the oxidative state of the molten glass, fuel and a primary oxidant are introduced into the refining zone (e.g., the spring zone) of the furnace at point above the molten glass through the burner. The fuel and primary oxidant may be injected into the furnace separately or in a premixed condition. The fuel and primary oxidant may be provided to furnace through a plurality of burners. Any suitable oxy-fuel burner may be employed in the practice of this invention. Examples of suitable oxy-fuel burners for use in the practice of this invention are the staged, flat-flame burner disclosed in U.S. Pat. Nos. 5,611,682; 6,524,097; 7,390,189 and U.S. patent application Ser. No. 12/688,115, filed Jan. 15, 2010; the disclosures of which are incorporated herein by reference. Suitable oxy-fuel burners are available commercially from Air Products and Chemicals, Inc. (Allentown, Pa.) as Cleanfire® HR or Cleanfire® HRi™ burners. If desired, the oxygen concentration in the refining zone can be increased further by employing techniques known in the art such as oxygen lancing, oxygen bubblers in the molten glass, among other techniques for introducing oxygen into the furnace environment and molten glass.

The fuel combusted in the furnace may be any gas or other fluid which contains combustibles which are capable of forming a combustion zone in the furnace. Among such fuels one can name natural gas, coke oven gas, propane, methane and oil (e.g., No. 2 fuel oil or No. 6 fuel oil).

The primary oxidant comprises a fluid having an oxygen concentration of at least about 50 volume percent oxygen, and typically at least 90 volume percent oxygen (e.g., oxygen supplied from a PSA, VSA, liquid oxygen tank, cryogenic air separation units, among other systems for storing and supplying oxygen). The primary oxidant may be commercially pure oxygen having an oxygen concentration of 99.5 percent or more In one aspect of the invention that relates to reducing the oxidative state of one or more cations in the glass, the fuel and primary oxidant are provided into furnace at flow rates such that the ratio of primary oxygen to fuel is less than about 95 percent of stoichiometric and typical is within the range of from about 18 to about 95 percent of stoichiometric.

In another aspect of the invention that relates to oxidizing the oxidative state of one or more cations in the glass, the fuel and primary oxidant are provided into furnace at flow rates such that the ratio of primary oxygen to fuel is greater than about 18% percent of stoichiometric and typically is within the range of from about 18 to about 110 percent of stoichiometric.

In a further aspect of the invention, both the fuel and primary oxidant are injected into furnace at a velocity of about 330 standard feet per second (sfps=volumetric flow scfs/area) or less. Typically the fuel is provided at a velocity of about 26 to about 330 sfps. After accelerating through the precombustor of the burner (e.g., as shown in greater detail in FIG. 3 wherein oxygen introduced into the burner surrounds natural gas as well as is used for staging/supplying additional oxygen), wherein the velocity can increase about 1.5 to about 3 times an inlet velocity, the velocity can be about 990 fps or less. In one aspect of the invention, the fuel is provided at a velocity of about 39 to about 990 fps.

In one aspect of the invention, the primary oxidant is provided at a velocity of about 6.5 to about 200 sfps. After accelerating through the precombustor of the burner (e.g, as shown in greater detail in FIG. 3), wherein the velocity can increase about 1.5 to about 3 times inlet velocity, the velocity can be between about 9.75 and about 600 fps.

A further aspect of the invention relates to using a staged flat flame burner that includes a staging value, a primary port and a fuel port (e.g., for supplying natural gas—NG). This burner can be used to supply an oxidizing or reducing gas layer proximate the molten glass in the refining zone. When the staging valve is open completely, about 23% of the total O2 flow goes through the primary port. If desired, the burner can be operated at a O2:NG molar flow ratio of about 1:1, or in some cases about 1.6:1 wherein stoichiometric ratio is 2:1 for complete combustion. When the burner is operated at a 1.6:1 stoichiometric ratio, then the most reducing gas layer in the primary port would have a stoichiometric ratio of about 1.6*0.23=0.368. This represents about 18.4% of stoichiometric ratio required for complete combustion in the primary port. In order to obtain the most reducing gas layer through the primary port, the remaining oxygen is passed through the staging port and at the desired overall stoichiometric ratio. To supply the most reducing gas layer proximate to the glass, the burner is operated with the primary port located close to the glass, and the staging valve open to direct the maximum amount of oxidant to the staging port.

If desired, the burner can be operated at a O2:NG molar flow ratio of about 6:1, or in some cases about 4:1 wherein stoichiometric ratio is 2:1 for complete combustion. When the staging valve is closed completely, about 93% of the total O2 flow goes through the primary port. Therefore, the least reducing gas layer in the primary port would have a stoichiometric ratio of about 4*0.93=3.72. This represents about 186% of stoichiometric ratio required for complete combustion in the primary port. In order to obtain the least reducing gas layer (the most oxidizing gas layer) through the primary port, the remaining oxygen is passed through the staging port and at the desired overall stoichiometric ratio. To supply the most oxidizing gas layer proximate to the glass, the burner is operated with the staging port located close to the glass, and the staging valve open to direct the maximum amount of oxidant to the staging port, and the maximum amount of oxidant proximate to the glass.

When the inventive method relates to reducing the oxidative state of the transition metal cations in the glass, combustion reaction products may include products of complete combustion but, owing to the defined substoichiometric primary oxygen to fuel ratio, will include unburned fuel. The incomplete combustion of the fuel with the primary oxidant enables the combustion of fuel and primary oxidant to proceed at a relatively low temperature than would otherwise be the case, thus reducing the tendency of NOx to form. The combustion reaction products may also include some residual oxygen because of incomplete mixing and short residence time during the combustion reaction although the concentration of oxygen within the combustion reaction will tend to approach thermodynamic equilibrium.

When the inventive method relates to oxidizing the oxidative state of the transition metal cations in the glass, combustion reaction products may include products of complete combustion but, owing to the defined superstoichiometric primary oxygen to fuel ratio, will include some residual oxygen. The incomplete reaction of all of the primary oxidant enables the combustion of fuel and primary oxidant to proceed at a substantially lower temperature than would otherwise be the case, thus reducing the tendency of NOx to form. The combustion reaction products may also include unburned fuel because of incomplete mixing and short residence time during the combustion reaction although the concentration of unburned fuel within the combustion reaction products approaches thermodynamic equilibrium.

In one aspect of the invention in order to establish a reducing gas layer over the molten glass surface, a secondary oxidant is provided into the furnace through a staging port above primary port (e.g., the orientation of the burner shown in FIG. 2 is rotated 180 degrees). Typically, in this aspect the secondary oxidant is injected into the furnace at a point that is further from the upper surface of the molten glass relative to the primary port. The secondary oxidant may be provided into the furnace from a point vertically above the fuel and primary oxidant, or from a point offset from the vertical, such as by an angle of up to 45 degrees.

In another aspect of the invention in order to establish an oxidizing gas layer over the molten glass surface, the secondary oxidant is provided into furnace through a staging port below primary port (e.g., the orientation of the burner corresponds to FIG. 2). Typically, in this aspect of the invention the secondary oxidant is injected into the furnace at a point that is between the upper surface of the molten glass and primary port. The secondary oxidant may be provided into the furnace from a point vertically below the fuel and primary oxidant, or from a point offset from the vertical (e.g., by an angle typically of up to about 45 degrees).

When employed, the secondary oxidant can be in the form of a fluid having an oxygen concentration of at least about 50 mole percent and in some cases at least 90 mole percent. The secondary oxidant may be commercially pure oxygen. When commercially pure oxygen is used, secondary oxidant can be provided into furnace at a velocity of about 400 sfps or less, and typically at a velocity of about 200 sfps or less. The velocity will be provided at higher velocities if the oxygen purity is lower. In most cases, the secondary oxidant has an oxygen concentration significantly greater than that of air. For a given amount of fuel consumption, the total volume of gases passed through the furnace lessens as the oxygen concentration of the oxidant increases. This lower volume flux through the furnace, at the velocities that can be employed for the staged combustion practice of this invention, enables the establishment of a secondary oxidant gas layer (either oxidizing or reducing depending on the embodiment) proximate the charge having a different composition than the contents in the rest of the furnace. The gas layer can be selected in order to achieve the desired oxidative state in the underlying molten surface.

In some cases, the momentum ratio of the fuel and primary oxidant stream to the secondary oxidant stream can be within the range of from about 0.5 to about 5.5 or less.

Secondary oxidant gas layer has an oxygen concentration which exceeds that of the combustion reaction products within combustion reaction zone. Although any suitable oxygen delivery system or lance may be used to inject the secondary oxidant into the furnace in the practice of this invention, it is desirable that the secondary oxidant be injected into the furnace using the gas injection lance disclosed in U.S. Pat. Nos. 5,611,682 and 7,390,189 which are incorporated herein by reference.

In the case where the goal is to reduce the oxidation state of the transition metal oxides in the molten glass, the secondary oxidant is provided into the furnace at a flowrate such that, when added to the primary oxidant, establishes an oxygen to fuel ratio that is at least about 80 percent of stoichiometric, and in some cases within the range of from about 90 to about 100 percent. When the ratio of the primary and secondary oxidant to the fuel is less than 100 percent of stoichiometric, the remaining oxygen needed to achieve complete combustion of the fuel within the furnace may be provided by infiltrating air.

In the case where the goal is to oxidize the oxidation state of the transition metal oxides in the molten glass, the secondary oxidant is provided into the furnace at a flowrate such that, when added to the primary oxidant, establishes an oxygen to fuel ratio that is at least about 100 percent of stoichiometric, and in some cases within the range of from about 100 to about 120 percent. When the ratio of the primary and secondary oxidant to the fuel is greater than about 100 percent of stoichiometric, the remaining oxygen is available for to achieve complete combustion elsewhere in the combustion space of the furnace and may be vented out through the exhaust port of the furnace.

In the reducing aspect of the invention, because of the position at which the secondary oxidant is provided into the furnace (e.g., above the primary port), a reducing gas layer can be formed which interacts with molten glass in a manner which differs from the interaction which would occur were the furnace atmosphere homogeneous. In the oxidizing embodiment of the invention because of the position at which the secondary oxidant is provided into the furnace (e.g., below the primary port), an oxidizing gas layer can be formed which interacts with the molten glass in a manner which differs from the interaction which would occur were the furnace atmosphere homogeneous.

Downstream of the combustion reaction, the secondary oxidant and the unburned fuel can mix, such as in a region away from the burner face within furnace, thus serving to prevent: 1) the secondary oxidant from directly interacting (reacting) with the oxidizable components of the molten glass in the reducing embodiment of the invention, or 2) the products of incomplete combustion from directly interacting (reacting) with the reducible components of the charge in the oxidizing embodiment of the invention, in order to complete the combustion of the fuel and to provide additional heat and combustion reaction products within the furnace.

The combustion reaction products in the furnace are generally exhausted through a flue port. When the present invention is used in a zone of a furnace with multiple zones, the combustion reaction products may be exhausted to the adjacent zone. The elevation of the flue port also influences the degree of furnace atmosphere stratification. If desired, the combustion reaction products in the furnace are exhausted from the furnace from a point not below point where fuel and primary oxidant are provided into the furnace.

While particular emphasis has been placed on float glass furnaces, the instant invention can be employed for controlling the oxidation state of a wide range of glasses such as fiberglass, container glass, table ware, specialty glass, among other glass types.

While particular emphasis has been placed on affecting the oxidation state of iron, other metal ions in molten glass can be oxidized or reduced in accordance with the instant invention.

While any suitable burner can be employed for heating and melting the charge, if desired staged flat flame burner(s) can be used throughout the furnace including for melting the charge and controlling the oxidative state in the refining zone. The oxy-fuel burners can be located at multiple locations along the furnace including in the crown or roof, adjacent to the hot spot, above the spring zone, among other suitable locations for supplying oxygen or a reducing gas to the molten glass surface and in order to affect the oxidative state of at least one metal species therein.

While the instant invention can be used in connection with a wide range of glass compositions, in certain aspects of this invention, the glass has a total iron content ($Fe_2O_3$-equivalent) of no more than about 0.1%, more preferably from about 0 (or 0.04) to 0.1%, even more preferably from about 0.01 (or 0.04) to 0.08%, and most preferably from about 0.03 (or 0.04) to 0.07%.

The following examples are provided to illustrate certain aspects of the invention and shall not limit the scope of the claims appended hereto.

EXAMPLES

Figure 4:
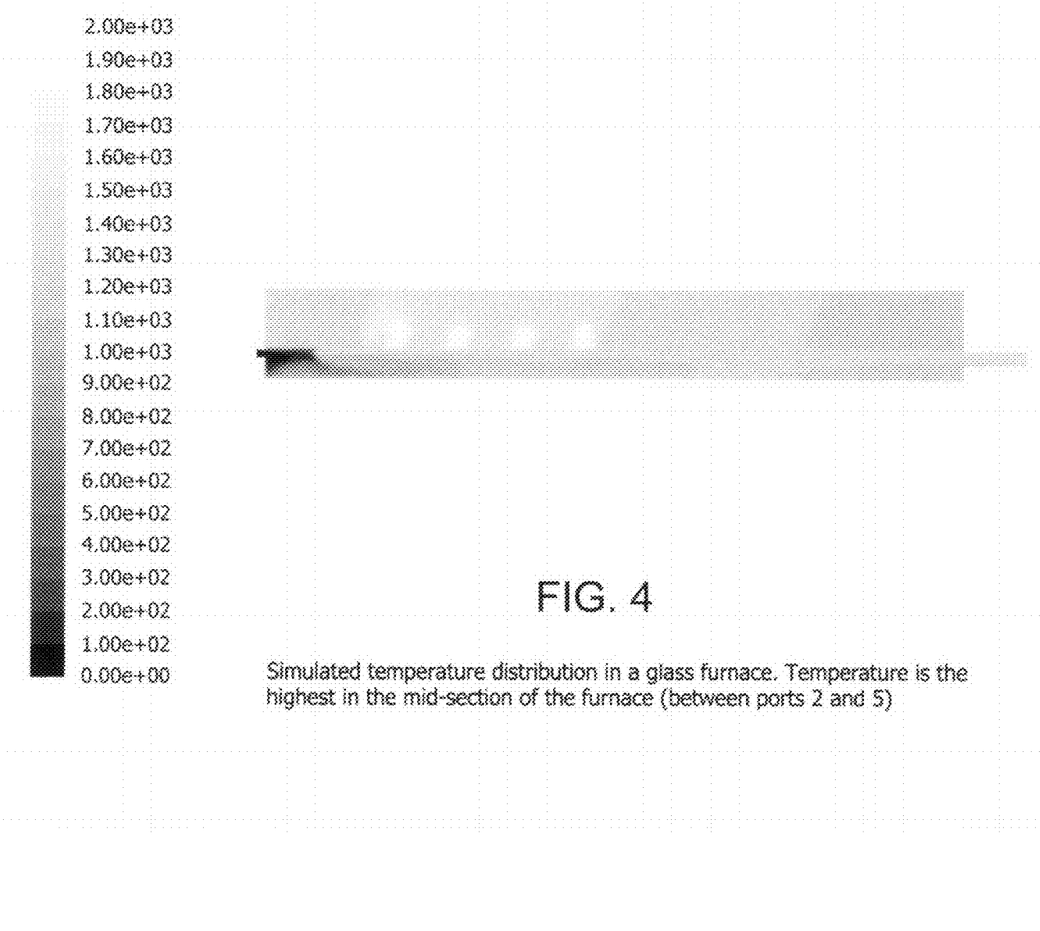
FIG. 4 is a schematic drawing illustrating temperature distribution along the length of a furnace.
Figure 5:
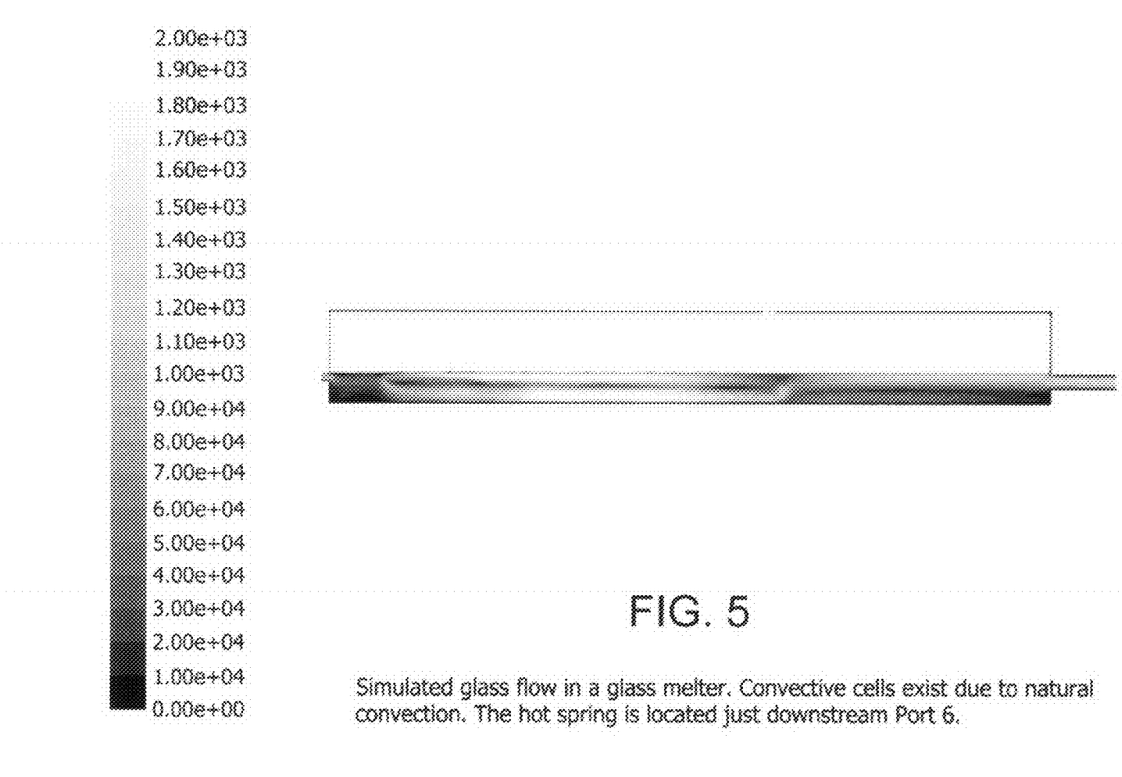
FIG. 5 is a schematic drawing illustrating temperature distribution along the length of a furnace.

Computational Fluid Dynamics (CFD) simulations were carried out to study the use of oxygen-fuel burners shown in FIG. 3 to control the oxidation state of iron ions in a soda lime silicate glass melt. The commercial software, Fluent (version 12.1), was used for this study. Three Examples are compared:

Example 1: is a baseline example that represents the conventional air-firing float glass furnace with a firing rate of 46.89 MW (160 MMBTU/hr) and a pull rate of 670 MTPD of a soda-lime-silicate glass. FIG. 4 shows the simulated temperature profile in the mid-plane of the furnace (the y axis is Temperature in degrees Celsius and the x axis corresponds to the length of the furnace). As shown, the temperature is the highest in the middle section of the furnace, around the port 5 and 6. Because of this temperature distribution, natural convection exists in the glass melt, and as a result there is a spring zone just downstream port 6 (as illustrated in FIG. 5 wherein the ports correspond to the rectangular openings above the glass melt and are numbered from left to right). Fe2O3 ($Fe^{3+}$) entered the charge end (the left-hand side of FIGS. 4 through 7) at a mass fraction of about 0.03%. As the temperature is increased, Fe2O3 is reduced to FeO ($Fe^{2+}$) and O2 with the highest FeO and O2 concentration around port 5 and 6. In the baseline example when a relatively low amount of oxygen is available in the atmosphere, the O2 in the glass melt diffuses out the glass, further shifts the reduction, and increases the concentration of FeO. While the FeO will be oxidized in the cooling down process downstream, the fugitive oxygen still leads to the presence of FeO at the point where the glass is discharged from the furnace.

Figure 6:
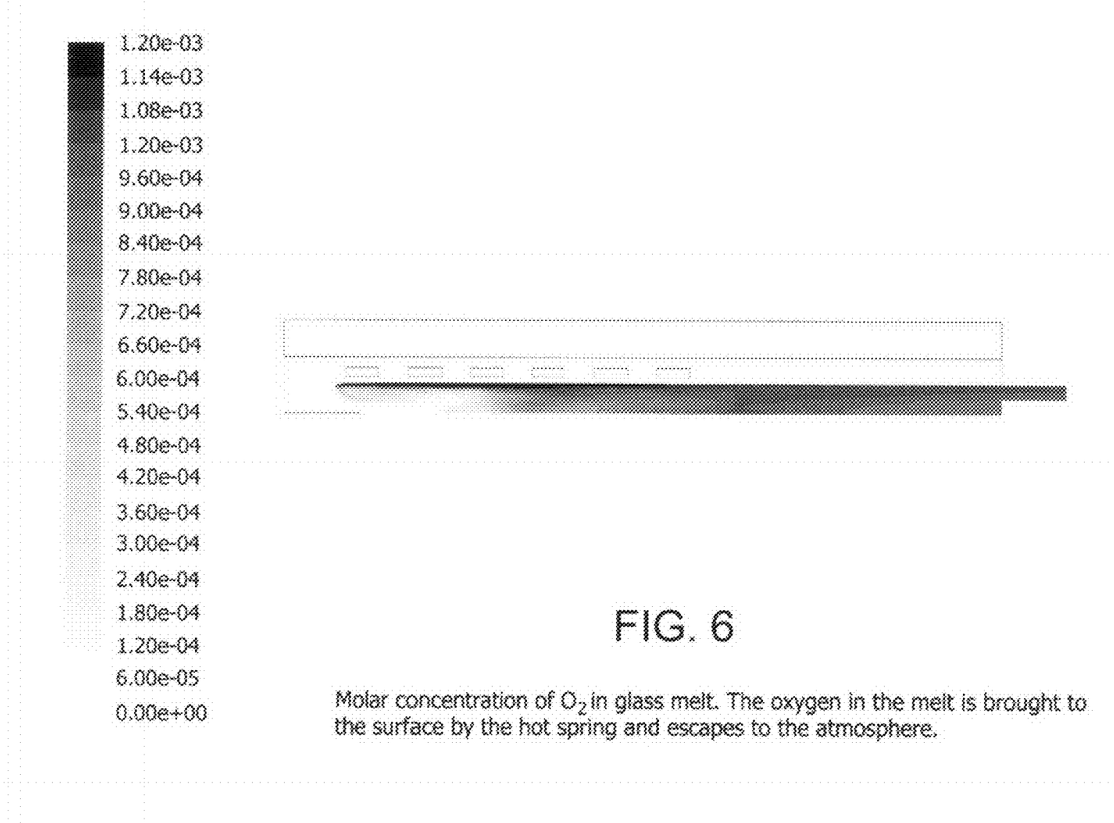
FIG. 6 is a schematic drawing illustrating temperature distribution along the length of a furnace.

Example 2 represents on example with the oxygen-fuel burner is installed above the spring zone of the glass melt (as illustrated in FIG. 6). The burner is operated with a stoichiometric ratio of 200%. The additional oxygen from the oxygen-fuel burner provides an oxygen rich environment above the spring zone and helps to prevent the escape of the oxygen from the melt to combustion space above the melt. As a result, the glass FeO concentration at the furnace exit is reduced by about 35% when compared to the baseline example (Example 1).

Figure 7:
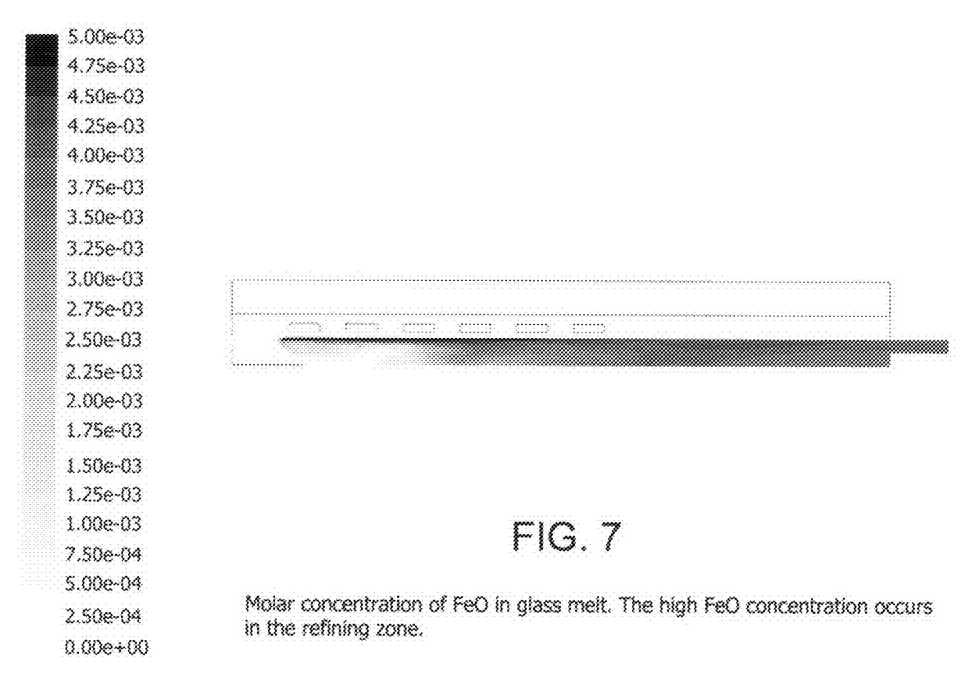
FIG. 7 is a schematic drawing illustrating temperature distribution along the length of a furnace.

Example 3 represents a case where the oxygen burner is installed over the batch (as illustrated in FIG. 7). Because the lower temperature in the batch region, iron is more thermodynamically stable in its $Fe^{3+}$ state, (and as a result oxygen concentration in the glass is relatively low), the reaction between $Fe^{3+}$ and $Fe^{2+}$ is slow, and the thermally activated diffusion of O2 into the glass melt is very small. Therefore the additional oxygen in the atmosphere does not provide any significant benefit in controlling the oxidation of the glass. The simulation shows the FeO concentration in the final production does not significantly change relative the example where there is no oxygen-fuel burner.

These examples show that desirable results in accordance with this invention can be achieved by locating an oxygen-fuel burner over the refining zone, and in particular, adjacent to or near the spring-zone of the furnace.

Examples 4 and 5

Figure 8:
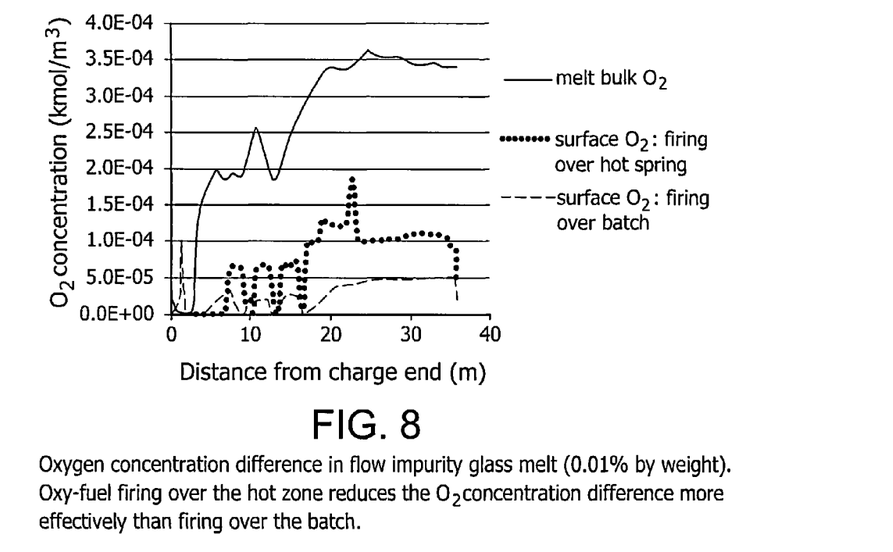
FIG. 8 is a graphical representation of oxygen concentration as a function of the distance away from the glass raw material or charge end of a glass furnace.
Figure 9:
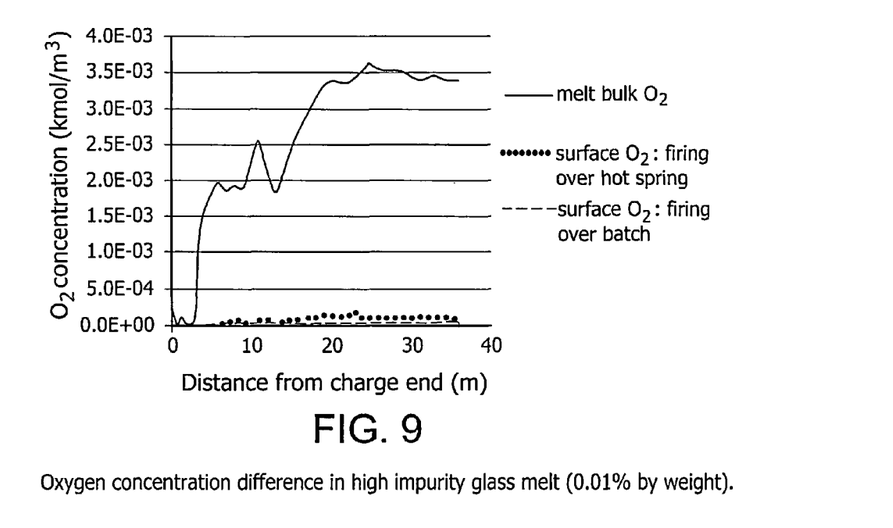
FIG. 9 is a graphical representation of oxygen concentration as a function of the distance away from the glass raw material or charge end of a glass furnace.

Examples 4 and 5 illustrate the affect of the instant invention as a function of iron impurity. Example 4 has an impurity of 0.01% $Fe_2O_3$ in the raw material (FIG. 8) and Example 5 has an impurity of 0.1% $Fe_2O_3$ (FIG. 9). Two approaches of introducing oxygen are employed by using an oxy-fuel burner in accordance with Examples 1-4, one with an oxy-fuel burner over the spring zone and the other over the batch. FIG. 8 shows that, when the impurity is relatively low (about 0.01% by weight), the oxygen concentration in the bulk of the melt is on the same order of magnitude as the oxygen concentration at the surface (e.g., injecting oxygen over the spring zone at the hot spot would have a significant impact on oxygen concentration). When the impurity is relatively high (about 0.1% by weight), the oxygen concentration in the bulk of the melt is much higher than the oxygen at the surface. As a result, injecting extra oxygen is not expected to have a significant impact on the oxygen transfer in Example 5/FIG. 9.

The present invention is not to be limited in scope by the specific aspects or embodiments disclosed in the examples which are intended as illustrations of a few aspects of the invention and any embodiments that are functionally equivalent are within the scope of this invention. Various modifications of the invention in addition to those shown and described herein will become apparent to those skilled in the art and are intended to fall within the scope of the appended claims.

The invention claimed is:

1. A method for changing the oxidation state of transition metal ion species in a furnace, wherein
    (i) the furnace is configured for continuous operation and comprises a charging end, a discharge end, a melting zone adjacent the charging end and a fining zone in fluid contact with the discharge end;
    (ii) glass forming ingredients are introduced into the melting zone, travel along a path from the melting zone to the fining zone and are withdrawn as molten glass from the fining zone; and
    (iii) the furnace has a combustion energy requirement in a combustion space over both the melting zone and the fining zone;
    the method comprising:
    (A) injecting into the combustion space at a point above the molten glass and downstream of the batch blanket, fuel and primary oxidant in a flat-flame configuration and a substoichiometric ratio not less than about 50 percent of stoichiometric, the primary oxidant being a fluid comprising at least 21 mole percent oxygen, both of the fuel and the primary oxidant being injected into the combustion space at a velocity of about 1000 feet per second or less;

(B) combusting the fuel and the primary oxidant within the combustion space to produce heat and combustion reaction products including unburned fuel;

(C) injecting secondary oxidant into the combustion space in a flat jet configuration below the injection point of the fuel and the primary oxidant such that the secondary oxidant is injected between the molten glass and the injection point of the fuel and the primary oxidant, the secondary oxidant being a fluid comprising at least about 21 mole percent oxygen, at a velocity of about 2000 standard feet per second or less;

(D) establishing an oxygen-rich gas layer proximate the molten glass, the oxygen-rich gas layer having a higher oxygen concentration than the molten glass;

(E) causing oxygen transport from the oxygen-rich layer into the molten glass, thereby driving a redox reaction of at least one transition metal ion species in the molten glass to oxidize the transition metal ion species; and (F) combusting secondary oxidant with unburned fuel to provide additional heat and combustion reaction products within the furnace.

2. The method of claim 1 wherein the molar flow ratio of oxygen in the primary and secondary oxidant to fuel is above that required for complete combustion.

3. The method of claim 1 wherein either the primary oxidant or secondary oxidant or both is a fluid comprising at least 50 mole percent oxygen.

4. The method of claim 1,
wherein the furnace includes a spring zone at the juncture of two convection cells in the molten glass; and
wherein the oxygen-rich layer is established proximate the spring zone.

5. A method for reducing transition metal ion species in molten glass in a furnace wherein
(i) the furnace is configured for continuous operation and comprises a charging end, a discharge end, a melting zone adjacent the charging end and a fining zone adjacent the discharge end;
(ii) glass forming ingredients are introduced into the melting zone, travel along a path from the melting zone to the fining zone and are withdrawn as molten glass from the fining zone; and
(iii) the furnace has a combustion energy requirement in a combustion space over both the melting zone and the fining zone;
the method comprising:
(A) injecting into the combustion space at a point above the molten glass and downstream of the batch blanket, fuel and primary oxidant in a staged flat-flame configuration and a substoichiometric ratio not exceeding about 70 percent of stoichiometric, the primary oxidant being a fluid comprising at least about 21 mole percent oxygen, both of the fuel and the primary oxidant being injected into the furnace at a velocity of about 1000 feet per second or less;
(B) combusting the fuel and the primary oxidant within the furnace to produce heat and combustion reaction products including unburned fuel;
(C) injecting secondary oxidant into the combustion space in a flat jet configuration above the injection point of the fuel and the primary oxidant such that the injection point of the fuel and the primary oxidant is between the injection of the secondary oxidant and the molten glass, the secondary oxidant being a fluid comprising at least about 21 mole percent oxygen, at a velocity of about 2000 standard feet per second or less;
(D) establishing a fuel-rich gas layer proximate the molten glass, the fuel-rich gas layer having a lower oxygen concentration than the molten glass;
(E) causing oxygen transport from the molten glass to the fuel-rich layer, thereby driving a redox reaction of at least one transition metal ion species in the molten glass to reduce the transition metal ion species; and
(F) combusting secondary oxidant with unburned fuel to provide additional heat and combustion reaction products within the furnace.

6. The method of claim 5 wherein the molar flow ratio of oxygen in the primary and secondary oxidant to fuel is below that required for complete combustion.

7. The method of claim 5 wherein either the primary oxidant or secondary oxidant or both is a fluid comprising at least 50 mole percent oxygen.

8. The method of claim 5,
wherein the furnace includes a spring zone at the juncture of two convection cells in the molten glass; and
wherein the fuel-rich layer is established proximate the spring zone.

* * * * *